United States Patent
Schmidt-Karaca (10) Patent No.: US 9,183,542 B2
(45) Date of Patent: Nov. 10, 2015

(54) ASSOCIATION OF A GROUPWARE OBJECT WITH SEQUENTIALLY-UPDATED CONTENT ITEMS

(75) Inventor: Markus Schmidt-Karaca, Heidelberg (DE)

(73) Assignee: SAP SE, Walldorf (DE)

(*) Notice: Subject to any disclaimer, the term of this patent is extended or adjusted under 35 U.S.C. 154(b) by 1872 days.

(21) Appl. No.: 12/269,151

(22) Filed: Nov. 12, 2008

(65) Prior Publication Data
US 2010/0121924 A1 May 13, 2010

(51) Int. Cl.
*G06F 15/16* (2006.01)
*G06Q 10/10* (2012.01)

(52) U.S. Cl.
CPC .............. *G06Q 10/107* (2013.01); *G06Q 10/10* (2013.01)

(58) Field of Classification Search
CPC .... G06Q 10/107; H04L 12/585; H04L 12/58; H04L 12/581; H04L 12/5855
USPC .................. 709/206, 217, 218, 219, 227, 228
See application file for complete search history.

(56) References Cited

U.S. PATENT DOCUMENTS

| | | | |
|---|---|---|---|
| 6,986,145 B2* | 1/2006 | Gangopadhyay | 719/316 |
| 7,793,274 B2* | 9/2010 | Kwong | 717/143 |
| 7,844,574 B2* | 11/2010 | Chen et al. | 707/610 |
| 7,984,056 B1* | 7/2011 | Kane | 707/749 |
| 8,060,634 B1* | 11/2011 | Darnell et al. | 709/231 |
| 8,065,392 B2* | 11/2011 | Wilkin et al. | 709/218 |
| 2003/0187668 A1* | 10/2003 | Ullmann et al. | 705/1 |
| 2008/0046482 A1* | 2/2008 | Oh et al. | 707/203 |
| 2009/0144786 A1* | 6/2009 | Branam et al. | 725/109 |

* cited by examiner

*Primary Examiner* — Philip Chea
*Assistant Examiner* — Van Kim T Nguyen
(74) *Attorney, Agent, or Firm* — Buckley, Maschoff & Talwalkar LLC (57) ABSTRACT

A system may include identification of a relation between a standards-compliant groupware object and one or more sequentially-updated content items, and creation of the groupware object. The groupware object may include a first Uniform Resource Identifier for subscribing a feed reader of a client device to a channel including the one or more sequentially-updated content items, and a second Uniform Resource Identifier to access a copy of the one or more sequentially-updated content items stored on the client device.

19 Claims, 6 Drawing Sheets

ASSOCIATION OF A GROUPWARE OBJECT WITH SEQUENTIALLY-UPDATED CONTENT ITEMS

FIELD

Some embodiments relate to the integration of groupware with a business application platform. In particular, some embodiments concern providing groupware objects and related content items to client devices using standards-based mechanisms.

BACKGROUND

Many business users employ groupware clients (e.g., Microsoft Outlook®, Lotus Notes®, etc.) for collaboration and communication. Business users may also utilize business applications for implementing business processes, such as but not limited to the applications of SAP Business All-in-One®. Such business applications typically execute within a business application platform having a dedicated user interface.

Some business application vendors currently provide various degrees of integration with groupware clients. This integration may enable the transmission of particular business information between groupware clients and a business application platform. Conventional integration, however, is unable to efficiently provide groupware clients with timely information from different information sources and having independent update cycles.

For example, an application platform may manage certain business information which corresponds to and can be represented by a groupware object (e.g., an appointment, a task, a contact). Such "groupware" information may be encapsulated in a corresponding groupware object and exchanged with a groupware client using known systems.

An application platform may also manage context information that is related to such groupware information. An example of context information is a factsheet including background information of a particular customer. This context information may be related in the application platform to all appointments representing a visit to the particular customer. A conventional system may attach such a fact sheet to a groupware object representing an appointment with the particular customer, and transmit the groupware object (with attachment) to a groupware client. The appointment is assigned to a calendar of the groupware client and may be accessed to view the factsheet when needed.

The appointment groupware object and the factsheet are stored local to the groupware client. If the appointment is updated within the business application platform, the platform may provide a corresponding updated groupware object to the groupware client. The updated groupware object may also include a most-recent version of the factsheet.

However, the update cycles of the groupware object (i.e., the appointment) and the context information (i.e., the factsheet) are independent of one another. More specifically, the factsheet may be updated within the business application platform even if the appointment is not updated. In such cases, the factsheet which is stored locally and in association with the appointment groupware object is not up-to-date.

A groupware client may be enhanced so as to retrieve context information (e.g., a factsheet) from a business application platform each time a corresponding local groupware object (e.g., an appointment) is accessed. In addition to software enhancements, this approach requires online connectivity and increases latency. Connectivity and latency issues may be addressed by a rich client application utilizing a framework (e.g., SAP Mobile Infrastructure®) that provides periodic synchronization with a back-end system. Such a client application would not provide the cost and usability benefits of a standards-based groupware client. Moreover, the client application would typically require installation of a database to store master data within a local persistence as well as a component for managing access to the database.

Systems are desired to efficiently provide groupware information and associated context information to a groupware client. Such systems may address the independent update cycles of such information and may also provide efficient access to such information.

DETAILED DESCRIPTION

Figure 1:
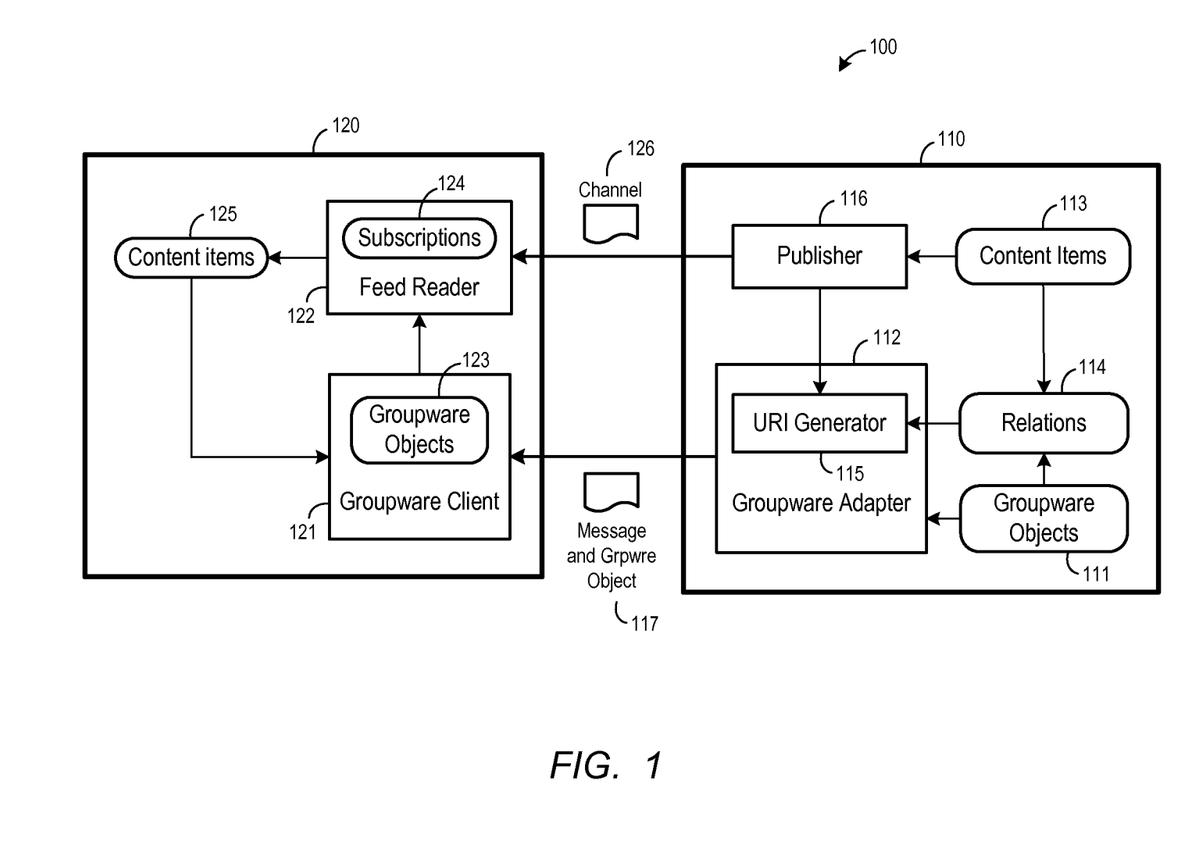
FIG. 1 is a block diagram of a system according to some embodiments.

FIG. 1 is a block diagram of system 100 according to some embodiments. Two or more of the elements of system 100 may be located remote from one another and may communicate with one another via a network and/or a dedicated connection. Moreover, each displayed element of system 100 may comprise any number of hardware and/or software elements suitable to provide the functions described herein, some of which are located remote from each other. Other topologies may be used in conjunction with other embodiments.

System 100 includes business system 110 and client device 120. Business system 110 may store business data, enable business processes to manipulate the business data, and provide business data and functionality to clients. Business system 110 includes groupware objects 111, which may be generated therein in any suitable manner. Groupware objects 111 may include, but are not limited to, objects compliant with RFC 2445—Internet Calendaring and Scheduling Core Object Specification (iCalendar) and objects compliant with RFC 2426—vCard MIME Directory Profile.

Groupware adapter 112 may create an internet electronic mail message and attach one of groupware objects 111 thereto. Such a message may comply with Request For Comments (RFC) 2822—Internet Message Format and may also comply with one or more extensions thereto (e.g., RFC 2045—Multipurpose Internet Mail Extensions (MIME) Part One: Format of Internet Message Bodies, RFC 2046—Multipurpose Internet Mail Extensions (MIME) Part Two: Media Types, RFC 2049—Multipurpose Internet Mail Extensions (MIME) Part Five: Conformance Criteria and Examples).

Business system 110 further includes content items 113, which may comprise any data that is related in any manner to one or more of groupware objects 111. Content items 113 may be updated independently of groupware objects 111.

Using the example provided above, groupware objects 111 may include an iCalendar object representing an appointment with a particular customer and content items 113 may include a factsheet associated with the particular customer.

Relations 114 indicate relations between one or more of content items 113 and one or more of groupware objects 111. Relations 114 may be specified by a data model of business system 110. According to some embodiments, Uniform Resource Identifier (URI) generator 115 may use relations 114 to determine two or more URI's to add to the internet electronic mail message created by groupware adapter 112.

One of the added URI's may correspond to publisher 116. Publisher 116 may publish one or more channels, or feeds, according to known standards such as RSS (i.e., "Rich Site Summary", "RDF Site Summary", or "Really Simple Syndication") or Atom. Each channel is a wrapper for one or more of content items 113, each of which may be updated regularly and sequentially. Publisher 116 transmits the one or more channels to client feed readers, or aggregators, in response to requests received therefrom. As will be described below, a feed reader may transmit such a request to publisher 116 using a URI corresponding to publisher 116.

Figure 2:
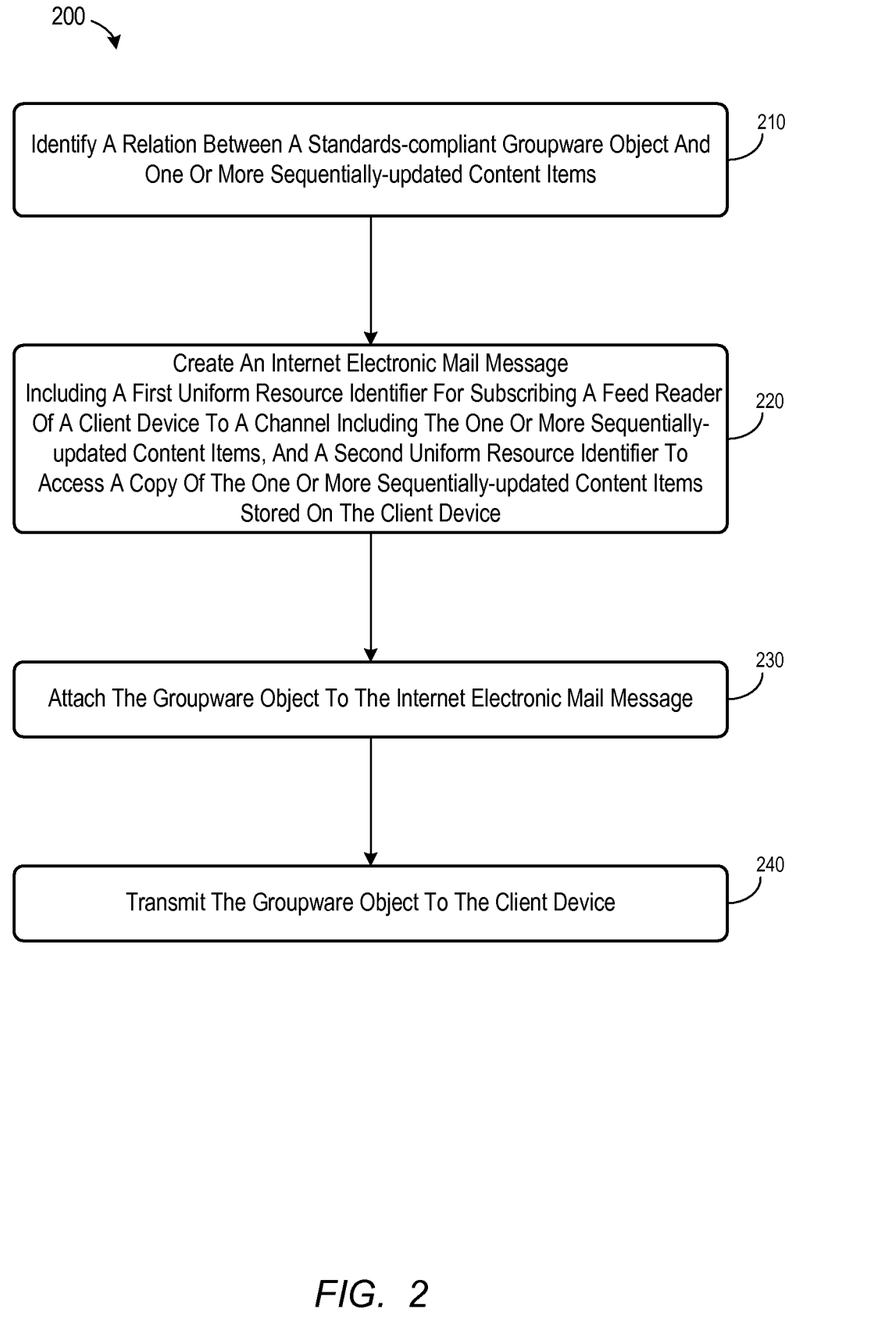
FIG. 2 is a flow diagram of a process according to some embodiments.

FIG. 2 is a flow diagram of process 200 according to some embodiments. Business system 110 may perform process 200 but embodiments are not limited thereto. Process 200 and all other processes mentioned herein may be embodied in processor-executable program code read from one or more of a computer-readable medium, such as a floppy disk, a CD-ROM, a DVD-ROM, a Zip™ disk, and magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

According to some embodiments, process 200 is triggered in response to creation or updating of a particular business object instantiation in business system 110. In this regard, business system 110 may support business objects, which are classes for encapsulating data and methods related to a particular business process or task. For example, business system 110 may support a SalesOrder business object, a CustomerAppointment business object, a CustomerFactsheet business object, and any other types of business objects. Instantiations of these business objects may be used to store the business data of business system 110. Content items 113 may also comprise such instantiations.

Business system 110 may include process agents to determine that a particular type of business object was instantiated (e.g., a CustomerAppointment business object) and to generate a corresponding standards-compliant groupware object in response. The process agents may also create any corresponding relations between the groupware object and content items 113 (e.g., a CustomerFactsheet business object) in relations 114. In some embodiments, the business object instantiation is converted to an intermediate format (e.g., string, eXtensible Markup Language) and from the intermediate format to the groupware object using appropriate handlers.

Regardless of how the groupware object was generated, a relation between the groupware object and one or more sequentially-updated content items is initially identified at 210 of process 200. The relation may be identified from a data model, from relations 114, or in any suitable manner.

An internet electronic mail message is then created at 220. The message comprises a first URI for subscribing a feed reader of a client device to a channel including the one or more sequentially-updated content items which are related to the groupware object. The first URI may identify publisher 116 as an internet resource and may be determined by URI generator 112. As is well known, the first URI may be entered into a desktop-based feed reader or may be selected in a feed-enabled Web browser to subscribe the reader/browser to the channel of publisher 116.

The internet electronic mail message also comprises a second URI to access a local copy of the one or more sequentially-updated content items stored on the client device. The second URI may also be determined by URI generator 112. Operation of a client device in conjunction with the second URI according to some embodiments will be described below.

Next, at 230, the groupware object is attached to the internet electronic mail message according to standard protocols. The internet electronic mail message may therefore be considered a groupware object as well as a carrier for one or more groupware objects.

Groupware adapter 112 may transmit the internet electronic mail message 117 to client device 120 at 240 using standard protocols, including but not limited to Simple Mail Transport Protocol (SMTP). An Internet Protocol address of client device 120 corresponds to a local-part of the recipient electronic mail address of the mail message.

Client device 120 may comprise may comprise any suitable device, such as a desktop computer, a laptop computer, a personal digital assistant, a tablet PC, and a smartphone. Generally, client device 120 may comprise any system to execute standards-based groupware client 121 and feed reader 122.

Groupware client 121 may comprise Microsoft Outlook®, Lotus Notes®, Mozilla Thunderbird®, Qualcomm Eudora®, Google Gmail®, or any other suitable application that is or becomes known. Groupware client 121 operates in conjunction with groupware objects 123, which may comprise locally-stored electronic mail messages, appointments (i.e., iCalendar objects) and contacts (i.e., vCard objects). Groupware objects 123 may also include, and groupware client 121 may be compatible with, groupware objects that do not conform to a groupware object standard.

Feed reader 122 may comprise a client application, an element of a Web browser, or any other application to perform the processes attributed thereto herein. Feed reader 122 may operate in conjunction with known standards to establish subscriptions 124 based on a URI corresponding to a feed publisher. For example, a subscription may be established by entering such a URI or selecting the URI in a user interface of feed reader 122. Each of subscriptions 124 may therefore specify an associated URI from which a channel is to be downloaded, as well an update schedule and a local file to store content items 125 of the downloaded channel.

In operation, feed reader 122 downloads a channel from a URI associated with a subscription 124 based on the subscription's specified update schedule. Feed reader 122 determines if the channel includes updated content items and, if so, updates content items 125. Feed reader 122 may also provide an interface to view content items 125.

Figure 3:
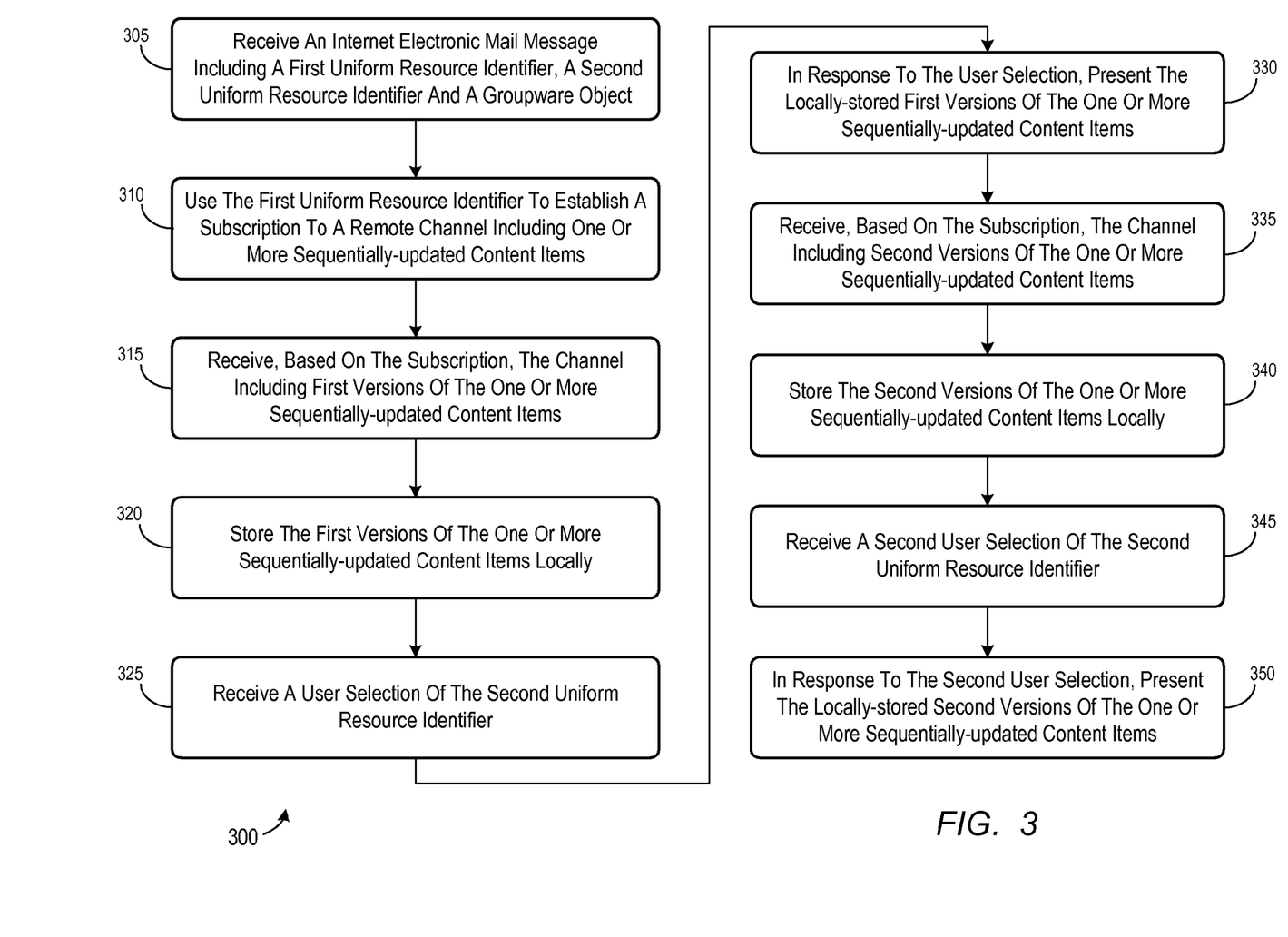
FIG. 3 is a view of a groupware client user interface for presenting a calendar groupware object according to some embodiments.

Process 300 of FIG. 3 may be executed by client device 120 of FIG. 1, but embodiments are not limited thereto. Initially, an internet electronic mail message is received at 305. The internet electronic mail message includes a first URI, a second URI and an attached groupware object. The first URI may be used to subscribe a feed reader of a client device to a channel including one or more sequentially-updated content items which are related to the groupware object. The second URI may be used to access a local copy of the one or more sequentially-updated content items stored on the client device. Accordingly, the internet electronic mail message received at 305 may comprise an internet electronic mail message created and transmitted according to an embodiment of process 200.

Figure 4:
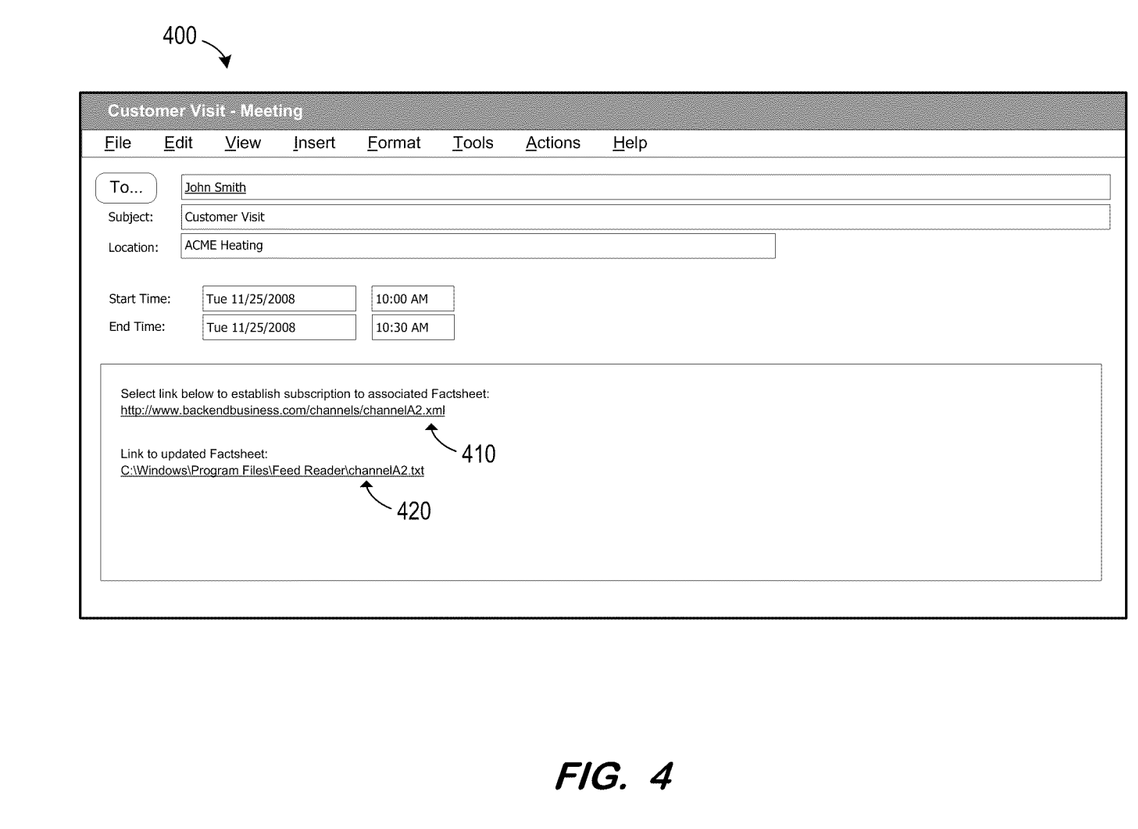
FIG. 4 is a flow diagram of a process according to some embodiments.

FIG. 4 is a view of groupware client user interface 400 according to some embodiments. For purposes of the present example, it will be assumed that groupware client interface 400 is an interface of groupware client 121 and is displayed by hardware of client device 120. Moreover, groupware client interface 400 of FIG. 4 presents an internet electronic mail message including an iCalendar groupware object received at 305 of process 300.

The groupware object relates to an appointment in the illustrated example. Accordingly, client interface 400 displays location and scheduling information of the associated appointment. Interface 400 also displays first URI 410 and second URI 420 as described above. First URI 410 is used at 310 to establish a subscription to a remote channel including one or more sequentially-update content items.

In some embodiments of 310, a user of client device 120 selects first URI 410 of interface 400. Selection of first URI 410 causes feed reader 122 to establish a subscription 124 corresponding to a particular channel of feed publisher 116. The channel includes content items related to the groupware object presented by interface 400. The subscription 124 may also specify an update schedule and a file of content items 125 in which to store the content items.

Next, at 315, the channel is received based on the established subscription. For example, feed reader 122 may request the channel from publisher 116 based on the update schedule of the subscription and using first URI 410 in conjunction with known protocols. In response, feed publisher 116 transmits channel 126 to feed reader 122.

The channel received at 315 includes first versions of the one or more sequentially-updated content items associated with the received groupware object. In some embodiments, channel 126 is in a standardized machine-readable format (e.g., Atom, RSS) and includes one or more content items. Each item of channel 126 may include any amount of text, URIs and metadata.

The received content items are stored locally in client device 120 at 315. The content items may be stored in a file of content items 125 which corresponds to second URI 420 of interface 400. In this regard, a user selection of second URI 420 is received at 325. Second URI 420 is formulated so as to point to the file in which feed reader 122 stores the content items as a result of the subscription established using first URI 410. Therefore, the locally-stored first versions of the one or more sequentially-updated content items are obtained and presented at 330 in response to the user selection.

Figure 5:
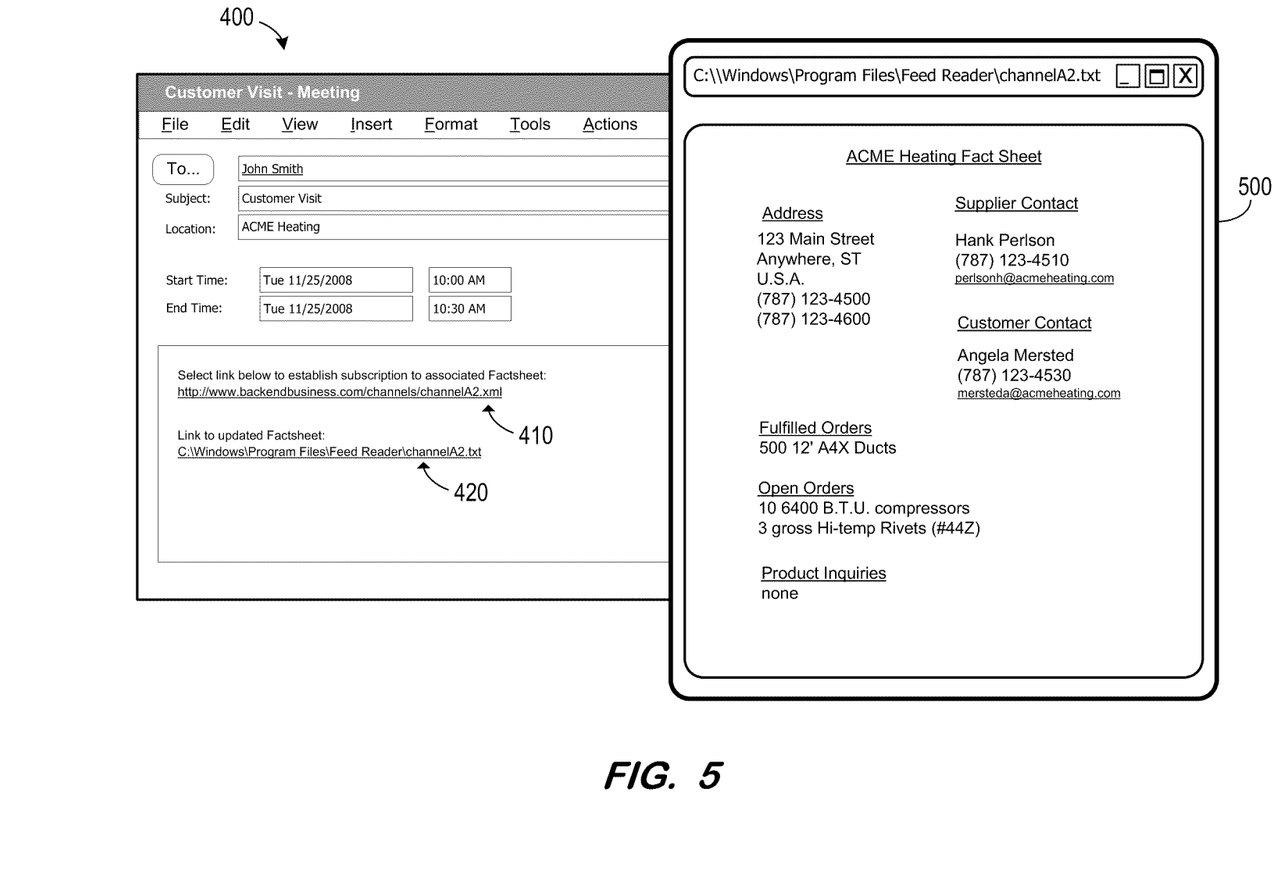
FIG. 5 is a view of a groupware client user interface for presenting a calendar groupware object according to some embodiments.

FIG. 5 is a view of window 500 which is presented according to some embodiments of 330. Window 500 displays text of a factsheet (i.e., a content item) corresponding to the groupware object presented in FIG. 4. The locally-stored one or more content items may be presented in any suitable manner according to some embodiments.

Content items 113 of business system 110 may change due to execution of business processes. As mentioned above, the update cycle of the groupware object may be independent of the update cycle of its associated and sequentially-updated content items. Accordingly, feed reader 122 periodically checks for updates to channel 126 based on the associated subscription 124.

Feed reader 122 may therefore receive channel 126 at 335, where channel 126 includes second versions of the one or more sequentially-updated content items associated with the received groupware object. Feed reader 122 then stores the second versions of the content items in the local file corresponding to second URI 420 at 340. Storage of the second versions of the content items overwrites the previously-received first versions of the content items.

A second user selection of second URI 420 is received at 345. The local file to which second URI 420 points now stores the second versions of the one or more sequentially-updated content items. The locally-stored second versions of the one or more content items are therefore obtained and presented at 350 in response to the second user selection.

Figure 6:
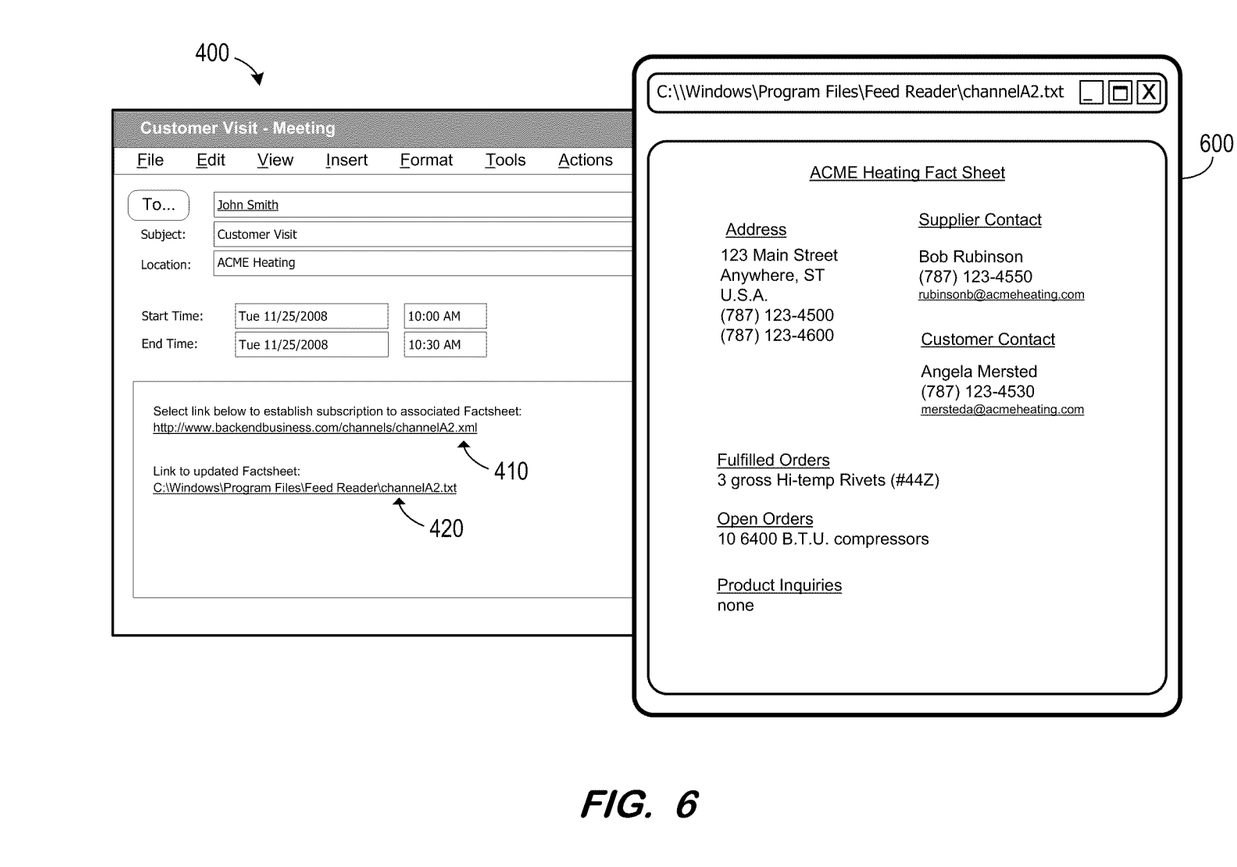
FIG. 6 is a view of a groupware client user interface for presenting a calendar groupware object according to some embodiments.

Window 600 of FIG. 6 may be presented according to some embodiments of 350. Similar to window 500 of FIG. 5, window 600 displays text of a factsheet corresponding to the groupware object presented in groupware client interface 400. However, the text of window 600 differs from the text of window 500 due to the intervening update of corresponding content items 113 of business system 110.

Some embodiments may therefore efficiently provide groupware objects and associated content items of a business system to a groupware client. Some embodiments may also or alternatively address the independent update cycles of such information and may also provide efficient online and offline access to such information.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments may be practiced with modifications and alterations limited only by the claims.

What is claimed is:

1. A method comprising:
   identifying a relation between a standards-compliant groupware object and a sequentially-updated content item;
   creating an internet electronic mail message to transmit to a client device, the internet electronic mail message comprising a first Uniform Resource Identifier for causing a feed reader of the client device to establish a subscription to periodically retrieve the sequentially-updated content items and store the retrieved sequentially-updated content item in a storage location in the client device, and a second Uniform Resource Identifier pointing to the storage location in the client device;
   attaching the groupware object to the internet electronic mail message; and
   transmitting the internet electronic mail message and the attached groupware object to the client device.

2. A method according to claim 1, comprising:
   receiving a first request for the sequentially-updated content item from the client device; and
   transmitting a first version of the sequentially-updated content item to the client device.

3. A method according to claim 2, comprising:
receiving a second request for the sequentially-updated content item from the client device; and
transmitting a second version of the sequentially-updated content items to the client device.

4. A method according to claim 1, wherein the standards-compliant groupware object comprises a calendar object and the sequentially-updated content item comprises a business object.

5. A method according to claim 4, wherein the business object comprises a customer factsheet.

6. A method comprising:
receiving an internet electronic mail message comprising a first Uniform Resource Identifier, a second Uniform Resource Identifier and an attached groupware object;
receiving a user selection of the first Uniform Resource Identifier;
in response to the user selection of the first Uniform Resource Identifier, establishing a subscription to periodically retrieve a remote sequentially-updated content item and store the retrieved sequentially-updated content item in a storage location in the client device;
retrieving, based on the subscription, a first version of the sequentially-updated content item;
storing the first version of the sequentially-updated content item in the storage location in the client device;
receiving a user selection of the second Uniform Resource Identifier;
in response to the user selection of the second Uniform Resource Identifier, retrieving the first version of the sequentially-updated content item from the storage location in the client device; and
presenting the first versions of the sequentially-updated content item retrieved from the storage location in the client device.

7. A method according to claim 6, further comprising:
retrieving, based on the subscription, a second version of the sequentially-updated content item;
storing the second version of the sequentially-updated content item in the storage location in the client device;
receiving a second user selection of the second Uniform Resource Identifier; and
in response to the second user selection of the second Uniform Resource Identifier, retrieving the second version of the sequentially-updated content item from the storage location in the client device; and
presenting the second versions of the sequentially-updated content item retrieved from the storage location in the client device.

8. A method according to claim 6, wherein the standards-compliant groupware object comprises a calendar object and the sequentially-updated content item comprises a customer factsheet.

9. A non-transitory medium storing processor-executable program code, the program code comprising:
code to identify a relation between a standards-compliant groupware object and one or more sequentially-updated content items;
code to create an internet electronic mail message to transmit to a client device, the internet electronic mail message comprising a first Uniform Resource Identifier for causing a feed reader of the client device to establish a subscription to periodically retrieve the sequentially-updated content items, and a second Uniform Resource Identifier pointing to the storage location in the client device;
code to attach the groupware object to the internet electronic mail message; and
code to transmit the internet electronic mail message and the attached groupware object to the client device.

10. A medium according to claim 9, the program code further comprising:
code to receive a first request for the sequentially-updated content item from the client device; and
code to transmit a first versions of the sequentially-updated content item to the client device.

11. A medium according to claim 10, the program code further comprising:
code to receive a second request for the sequentially-updated content item from the client device; and
code to transmit a second versions of the sequentially-updated content item to the client device.

12. A medium according to claim 9, wherein the standards-compliant groupware object comprises a calendar object and the sequentially-updated content item comprises a business object.

13. A medium according to claim 12, wherein the business object comprises a customer factsheet.

14. A non-transitory medium storing processor-executable program code, the program code comprising:
code to receive an internet electronic mail message comprising a first Uniform Resource Identifier, a second Uniform Resource Identifier and an attached groupware object;
code to receive a user selection of the first Uniform Resource Identifier;
code to establish, in response to the user selection of the first Uniform Resource Identifier, a subscription to periodically retrieve a remote sequentially-updated content item and store the retrieved sequentially-updated content item in a storage location in the client device;
code to retrieve, based on the subscription, a first version of the sequentially-updated content items;
code to store the first version of the sequentially-uploaded content item in a storage location in the client device;
code to receive a user selection of the second Uniform Resource Identifier;
code to retrieve, in response to the user selection of the second Uniform Resource Identifier, the first version of the sequentially-updated content item from the storage location in the client device; and
code to present the first version of the sequentially-updated content item retrieved from the storage location in the client device.

15. A medium according to claim 14, the program code further comprising:
code to retrieve, based on the subscription, a second version of the sequentially-updated content item;
code to store the second version of the sequentially-updated content item in the storage location in the client device;
code to receive a second user selection of the second Uniform Resource Identifier;
code to retrieve, in response to the second user selection of the second Uniform Resource Identifier, the second version of the sequentially-updated content item from the storage location in the client device; and
code to present the second versions of the sequentially-updated content item retrieved from the storage location in the client device.

16. A medium according to claim 14, wherein the standards-compliant groupware object comprises a calendar object and the sequentially-updated content item comprises a customer factsheet.

17. A system comprising:
a computing device comprising:
a memory storing processor-executable program code; and
a processor to execute the processor-executable program code in order to cause the computing device to:
identify a relation between a standards-compliant groupware object and a sequentially-updated content item;
create an internet electronic mail message to transmit to a client device, the internet electronic mail message comprising a first Uniform Resource Identifier for causing a feed reader of a client device to establish a subscription to periodically retrieve the including the one or more sequentially-updated content items and store the retrieved sequentially-updated content item in a storage location in the client device, and a second Uniform Resource Identifier pointing to the storage location in the client device;
attach the groupware object to the internet electronic mail message; and
transmitting the internet electronic mail message and the attached groupware object to the client device.

18. A system according to claim 17, the business application platform further to:
receive a first request for the sequentially-updated content item from the client device; and
transmit a first versions of the sequentially-updated content item to the client device.

19. A system according to claim 18, the business application platform further to:
receive a second request for the sequentially-updated content item from the client device; and
transmit a second version of the sequentially-updated content item to the client device.

* * * * *